(12) United States Patent
He et al.

(10) Patent No.: US 11,681,560 B2
(45) Date of Patent: Jun. 20, 2023

(54) METHOD, ELECTRONIC DEVICE, AND COMPUTER PROGRAM PRODUCT FOR PROACTIVELY ADJUSTING AVAILABLE COMPUTING POWER OF A COMPUTING NODE BASED ON MOVEMENT OF AT LEAST ONE USER DEVICE

(71) Applicant: EMC IP Holding Company LLC, Hopkinton, MA (US)

(72) Inventors: Bin He, Shanghai (CN); Zhen Jia, Shanghai (CN); Danqing Sha, Shanghai (CN); Si Chen, Shanghai (CN); Zhenzhen Lin, Shanghai (CN)

(73) Assignee: EMC IP Holdinq Company LLC, Hopkinton, MA (US)

( * ) Notice: Subject to any disclaimer, the term of this patent is extended or adjusted under 35 U.S.C. 154(b) by 247 days.

(21) Appl. No.: 17/101,052

(22) Filed: Nov. 23, 2020

(65) Prior Publication Data
US 2022/0138007 A1    May 5, 2022

(30) Foreign Application Priority Data
Oct. 30, 2020 (CN) .......................... 202011194759.X

(51) Int. Cl.
*G06F 9/50* (2006.01)

(52) U.S. Cl.
CPC ............ *G06F 9/505* (2013.01); *G06F 9/5072* (2013.01); *G06F 9/5094* (2013.01)

(58) Field of Classification Search
None
See application file for complete search history.

(56) References Cited

U.S. PATENT DOCUMENTS

| | | | | |
|---|---|---|---|---|
| 10,042,410 | B2* | 8/2018 | Malik | ............... H04L 41/5003 |
| 10,986,173 | B1* | 4/2021 | Thomason | ......... H04L 67/1021 |
| 2015/0339169 | A1* | 11/2015 | Siddiqui | ................ H04L 67/51 |
| | | | | 718/104 |
| 2020/0133702 | A1* | 4/2020 | Sharma | ................ G06F 9/5088 |

(Continued)

OTHER PUBLICATIONS

Wen et al.; "Energy-Efficient Device-to-Device Edge Computing Network: An approach Offloading both Traffic and Computation"; IEEE Communication Magazine; Sep. 2018 (Year: 2018).*

(Continued)

*Primary Examiner* — Eric C Wai
(74) *Attorney, Agent, or Firm* — Ryan, Mason & Lewis, LLP

(57) ABSTRACT

Embodiments of the present disclosure relate to a method, an electronic device, and a computer program product for adjusting a computing load. The method in an illustrative embodiment includes: determining a total computing power demand of at least one user device that will be switched, due to movement, to being provided a computing service by a computing node; determining an available computing power of the computing node; and if the available computing power is unable to meet the total computing power demand, by adjusting a computing load of the computing node, adjusting the available computing power before the at least one user device is switched to being provided the computing service by the computing node, so as to meet the total computing power demand.

20 Claims, 5 Drawing Sheets

(56) References Cited

U.S. PATENT DOCUMENTS

2021/0383206 A1* 12/2021 Teppoeva ............... G06N 3/08

OTHER PUBLICATIONS

A. Gionis et al., "Clustering Aggregation," ACM Transactions on Knowledge Discovery from Data, vol. 1, No. 1, Article 4, Mar. 2007, 30 pages.
Wikidpedia, "Consensus Clustering," en.wikipedia.org/wiki/Consensus_clustering, Nov. 12, 2020, 7 pages.
Wikidpedia, "Hierarchical Clustering," en.wikipedia.org/wiki/Hierarchical_clustering, Oct. 7, 2020, 8 pages.

* cited by examiner

METHOD, ELECTRONIC DEVICE, AND COMPUTER PROGRAM PRODUCT FOR PROACTIVELY ADJUSTING AVAILABLE COMPUTING POWER OF A COMPUTING NODE BASED ON MOVEMENT OF AT LEAST ONE USER DEVICE

RELATED APPLICATION(S)

The present application claims priority to Chinese Patent Application No. 202011194759.X, filed Oct. 30, 2020, and entitled "Method, Electronic Device, and Computer Program Product for Adjusting Computing Load," which is incorporated by reference herein in its entirety.

FIELD

Embodiments of the present disclosure generally relate to the field of mobile computing, and more particularly, to a method, an electronic device, and a computer program product for adjusting a computing load.

BACKGROUND

With the explosive growth of data and computing demands, more and more applications and computing tasks are being moved from clouds to edges using mobile edge computing technologies. Mobile edge computing technologies provide a way to move data closer to users, thereby saving the data transmission backhaul bandwidth and responding to user requests faster. However, while the loads of computing, storage, and network increase sharply, a problem of insufficient edge resources appears. There are many solutions to transfer tasks from an overloaded server to another idle server, but most of them are responsive solutions. In extreme cases, there may still be some delays or traffic fluctuations, which will affect the user experience, especially the user experience of VIP users who have a high demand for computing services.

SUMMARY

Embodiments of the present disclosure provide a method, an electronic device, and a computer program product for adjusting a computing load.

In a first aspect of the present disclosure, a method for adjusting a computing load is provided. The method includes: determining a total computing power demand of at least one user device that will be switched, due to movement, to being provided a computing service by a computing node; determining an available computing power of the computing node; and if the available computing power is unable to meet the total computing power demand, by adjusting a computing load of the computing node, adjusting the available computing power before the at least one user device is switched to being provided the computing service by the computing node, so as to meet the total computing power demand.

In a second aspect of the present disclosure, an electronic device is provided. The device includes: at least one processing unit; and at least one memory which is coupled to the at least one processing unit and stores instructions for execution by the at least one processing unit, wherein the instructions, when executed by the at least one processing unit, cause the device to perform actions including: determining a total computing power demand of at least one user device that will be switched, due to movement, to being provided a computing service by a computing node; determining an available computing power of the computing node; and if the available computing power is unable to meet the total computing power demand, by adjusting a computing load of the computing node, adjusting the available computing power before the at least one user device is switched to being provided the computing service by the computing node, so as to meet the total computing power demand.

In a third aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

With the technical solution of illustrative embodiments of the present disclosure, before the user device is switched to being provided the computing service by another computing node, the computing load of the other computing node can be adjusted to ensure that the available computing power can meet the computing power demand of the user device, thereby reducing the switching delay and improving the user experience.

This Summary is provided in order to introduce the selection of concepts in a simplified form, which will be further described in the Detailed Description below. The Summary is not intended to identify key features or essential features of the embodiments of the present disclosure, nor is it intended to limit the scope of the embodiments of the present disclosure.

BRIEF DESCRIPTION OF THE DRAWINGS

The above and other objectives, features, and advantages of the present disclosure will become more apparent from the following detailed description of example embodiments of the present disclosure in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Figure 1:
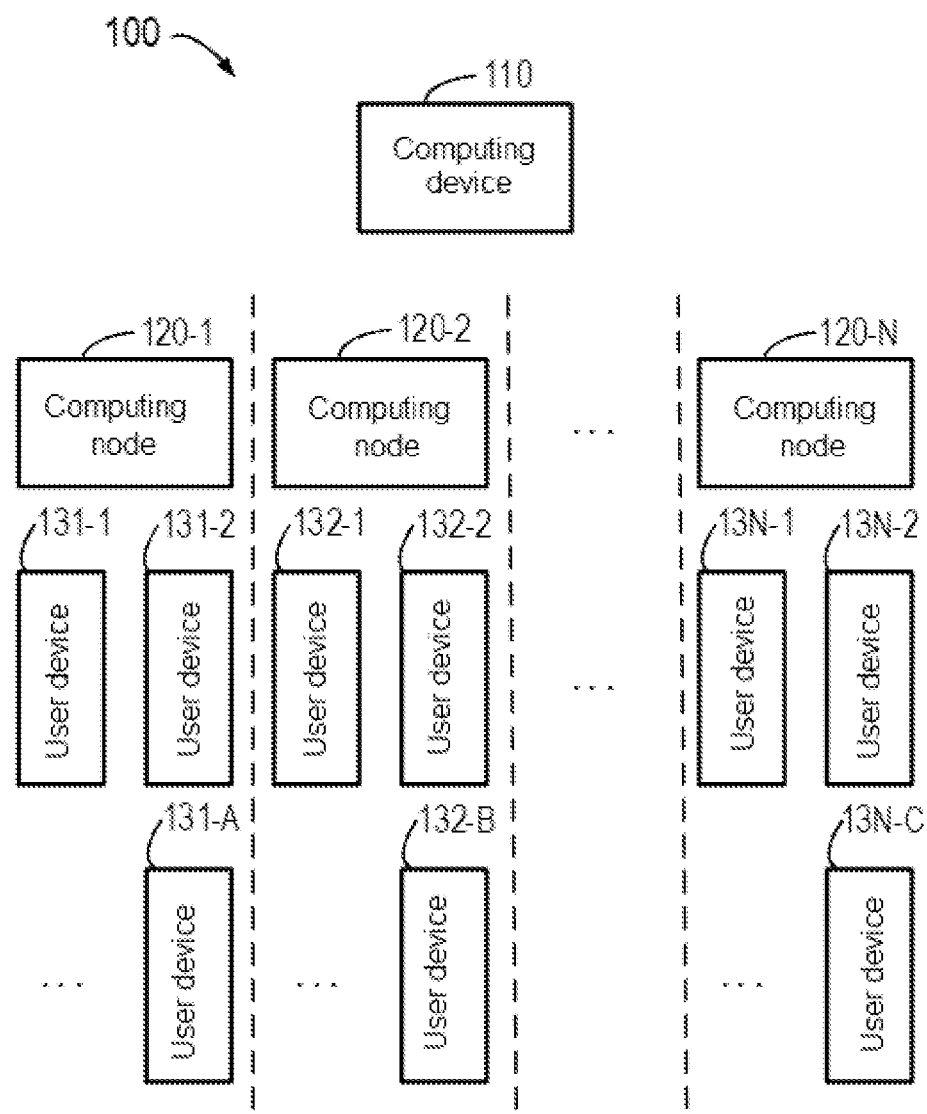
FIG. 1 illustrates a schematic diagram of example environment 100 in which a device and/or a method according to an embodiment of the present disclosure may be implemented.

Hereinafter, illustrative embodiments of the present disclosure will be described in more detail with reference to the accompanying drawings. Although the illustrative embodiments of the present disclosure are shown in the drawings, it should be understood that the present disclosure can be implemented in various forms and should not be limited by the embodiments set forth herein. Rather, these embodiments are provided so that this disclosure will be more thorough and complete, and will fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" means "at least one further embodiment." The terms "first," "second," etc., may refer to different or the same objects. Other explicit and implicit definitions may also be included below.

5G technology is designed to support many vertical industries and provide fast and reliable communications. Edge stations as computing nodes in a 5G network can provide significant benefits to network performance and user experience, and typically they can serve their own geographic areas. However, the computing capacity of an edge station is much smaller than that of an ordinary data center. When the computing load converges centrally, the computing power of an individual edge station may reach an upper limit, which will affect the user experience. However, in such so-called extreme cases, especially for high-priority VIP users with strict requirements for delays or throughput, there will be an expectation that 5G technology will be able to meet corresponding service level agreements.

There are many solutions to transfer tasks from an overloaded server to another idle server, but most of them are responsive solutions. When using these solutions, incoming high-priority services on edge stations that are already overloaded or will be overloaded, if unloaded in a passive manner, will more or less affect upcoming services. In addition, the unloading process involves selection of candidate edge stations or clouds, computation, and extensive message interactions for packet/data downloading, and such processing takes time to complete. As a result, the edge stations will always be overloaded during the transition, and the services are likely to be interrupted.

In order to at least partially solve the above problems and one or more other potential problems, the embodiments of the present disclosure propose a solution for adjusting a computing load of a computing node. The solution involves preventive unloading of applications. For example, a mobile edge computing service layer may monitor the resource consumption and incoming services, and will act proactively if the mobile edge computing service layer predicts that the current edge station may become overloaded and have insufficient process capacity due to upcoming incoming resources. For example, when a train with a large number of VIP users is rapidly approaching a city center, it will be too late to remove existing loads after an edge station detects that a cluster of users are approaching. As a result, in conjunction with expected movement of users, the mobile edge computing service layer can predict incoming loads and unload pre-existing low-priority applications to other computing entities, such as clouds, data centers, or other edge stations, so as to reserve resources, thus providing smooth edge station switching and user experience for the VIP users.

In embodiments of the present disclosure, an edge station is used as an example for illustration, but the protection scope of the present disclosure is not limited thereto; instead, it may apply to various computing nodes capable of providing computing services.

FIG. 1 illustrates a schematic diagram of example environment 100 in which a device and/or a method according to an embodiment of the present disclosure may be implemented. According to an embodiment of the present disclosure, example environment 100 in FIG. 1 includes computing device 110, computing nodes 120-1, 120-2, . . . , and 120-N that may be collectively referred to as computing nodes 120, user devices 131-1, 131-2, . . . , and 131-A that may be collectively referred to as user devices 131, user devices 132-1, 132-2, . . . , and 132-B that may be collectively referred to as user devices 132, and user devices 13N-1, 13N-2, . . . , and 13N-C that may be collectively referred to as user devices 13N.

In example environment 100 in FIG. 1, user devices 131 are provided computing services by computing node 120-1, user devices 132 are provided computing services by computing node 120-2, and user devices 13N are provided computing services by computing node 120-N. Computing device 110 is used to collect various information associated with computing nodes 120, user devices 131, user devices 132, and user devices 13N. The various information includes, for example, location information of computing nodes 120, an available computing power of computing nodes 120, a list of user devices serviced by computing nodes 120, location information and movement information of user devices 131, user devices 132, and user devices 13N, and a computing power demand of each of user devices 131, user devices 132, and user devices 13N, as well as a total computing power demand thereof. In addition, computing device 110 is also used, for example, to determine the service ranges of computing nodes 120 and the service boundaries between computing nodes 120. At the same time, computing device 110 is also used to control computing nodes 120 to perform various operations. These operations include, for example, computing nodes 120 adjusting their own computing loads.

It should be understood that example environment 100 is only illustrative and not restrictive, and it is extensible. For example, example environment 100 may include one or more additional instances of computing device 110, so that it is possible to more efficiently implement the technical solution of the present disclosure for adjusting a computing load of a computing node through, for example, parallel computing and distributed computing. In addition, computing device 110 shown separately in example environment 100 is for illustrative purposes only, and computing device 110 may also be integrated into any of computing nodes 120 or into a data center.

In example environment 100 in FIG. 1, communications such as data transmission and instruction transmission between computing device 110 and computing nodes 120, user devices 131, user devices 132, and user devices 13N may be carried out over a network.

Figure 2:
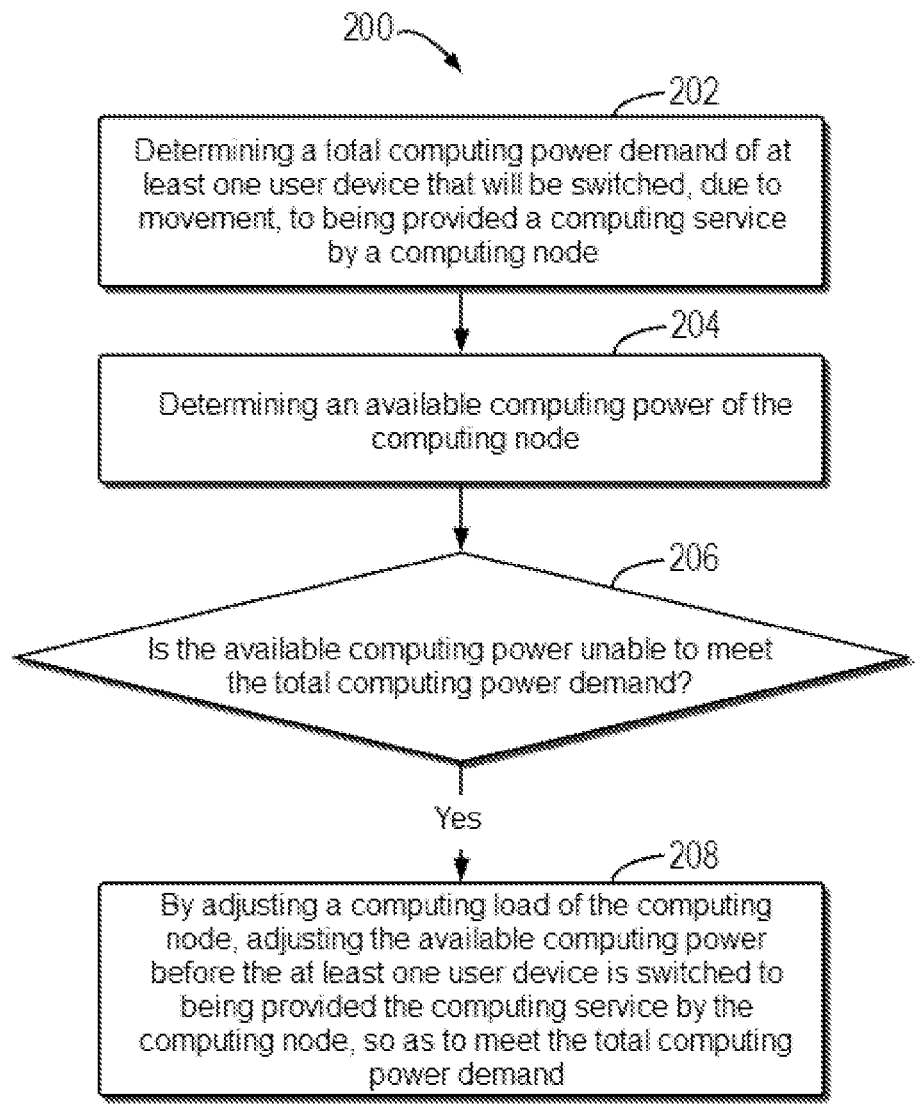
FIG. 2 illustrates a flowchart of method 200 for adjusting a computing load according to an embodiment of the present disclosure.

FIG. 2 illustrates a flowchart of method 200 for adjusting a computing load according to an embodiment of the present disclosure. Method 200 may be implemented by computing device 110 shown in FIG. 1 or by other appropriate devices. It should be understood that method 200 for adjusting a computing load may further include additional steps not shown and/or may omit shown steps, and the scope of the embodiments of the present disclosure is not limited in this respect.

In block 202, computing device 110 determines a total computing power demand of at least one user device that will be switched, due to movement, to being provided a computing service by a computing node. According to an embodiment of the present disclosure, when a user device is moving, it is possible that the user device is switched from being provided a computing service by an original computing node to being provided a computing service by another computing node due to reasons such as geographic locations and hours of service. According to some embodiments of the present disclosure, these factors as reasons may be preset. For example, when a user moves beyond a certain coordinate location, switching between computing nodes can be carried out. For another example, when the user is in a position where the computing service can be provided by multiple computing nodes at the same time, switching between computing nodes can also be set to be performed after a certain time. According to some other embodiments of the present disclosure, these factors as reasons may be derived by calculation and may be adjusted over time.

When computing device 110 determines that the at least one user device will be switched, due to movement, to being provided a computing service by another computing node, computing device 110 determines a total computing power demand of these user devices. According to an embodiment of the present disclosure, the computing power demand of a user device may include a computing power required by applications in the user device or by computing services to which the user device is entitled. When a user device is switched to being provided a computing service by another computing node, it is necessary to ensure, by meeting the computing power demand of the user device, that the computing service experience for the user device will not be degraded.

According to an embodiment of the present disclosure, computing device 110 may determine the total computing power demand in response to determining that the at least one user device will be switched, within a threshold time period, to being provided the computing service by the computing node. This is due to the fact that if multiple user devices are switched to being provided the computing service by the computing node at a long interval, the available computing power of the computing node itself may have changed, and the user devices that were switched earlier may be switched again to being provided the computing service by another computing node. Therefore, setting this threshold time period can ensure that neither the available computing power of the computing node nor the total computing power demand of the user devices that have been switched to being provided the computing service by this computing node change during the time period in which the at least one user device has completed switching. According to an embodiment of the present disclosure, this threshold time period may be set through experience, or may be determined, for example, through machine learning technology.

According to an embodiment of the present disclosure, when it is determined that the at least one user device will be switched, within the threshold time period, to being provided the computing service by the computing node, computing device 110 may first determine the service range in which the computing node provides the computing service. Afterwards, computing device 110 may determine, in response to determining that the at least one user device will enter the service range within the threshold time period, that the at least one user device will be switched, within the threshold time period, to being provided the computing service by the computing node.

According to an embodiment of the present disclosure, computing device 110 may determine the service range based on locations of multiple user devices for which a computing service is provided by the computing node.

Figure 3:
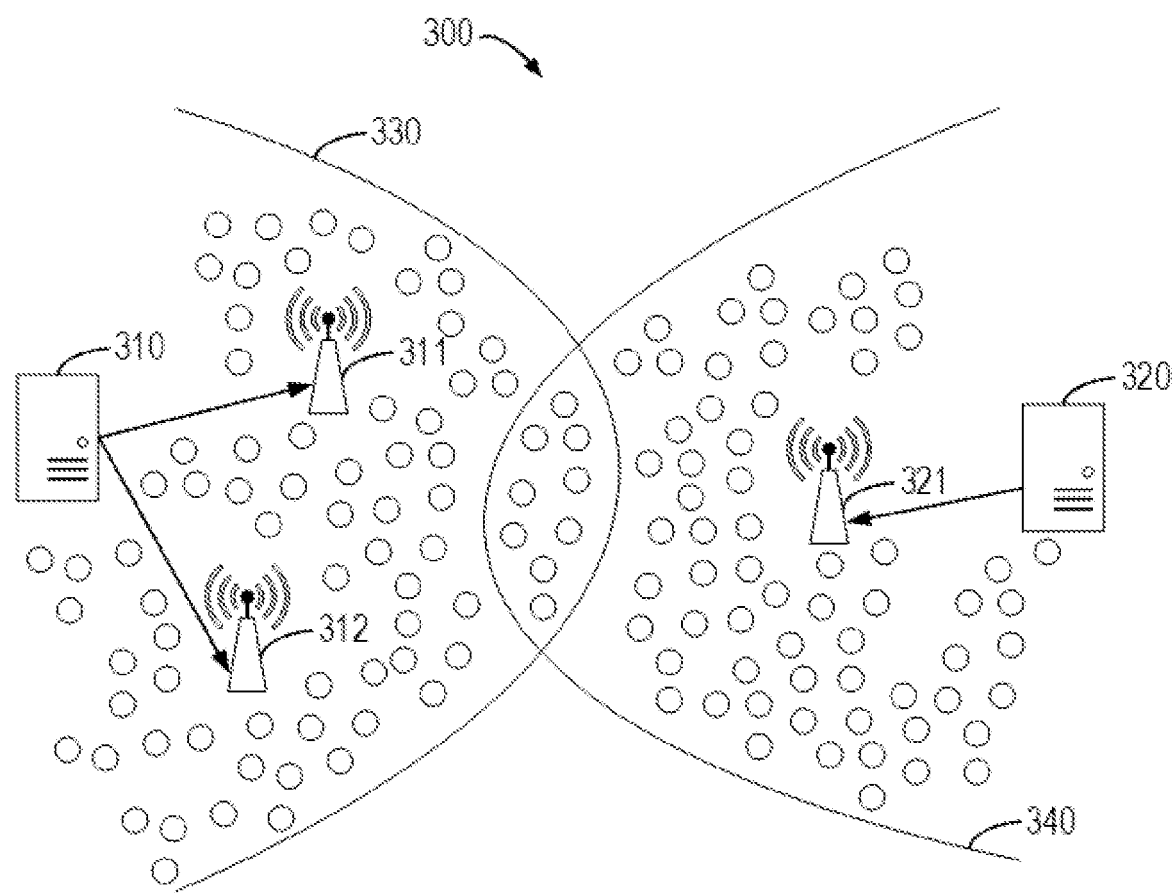
FIG. 3 illustrates a schematic diagram of scenario 300 for determining a service range of a computing node according to an embodiment of the present disclosure.

FIG. 3 illustrates a schematic diagram of scenario 300 for determining a service range of a computing node according to an embodiment of the present disclosure. According to an embodiment of the present disclosure, scenario 300 in FIG. 3 includes computing nodes 310 and 320, wireless access networks 311, 312, and 321, and service boundaries 330 and 340. In addition, small circles in FIG. 3 represent user devices. In scenario 300, computing node 310 provides the computing service over wireless access networks 311 and 312, and computing node 320 provides the computing service over wireless access network 321. The ranges surrounded by service boundaries 330 and 340, respectively, are the service ranges of computing nodes 310 and 320. It can be seen that there is an intersecting portion of the service ranges of computing nodes 310 and 320, and that user devices in the intersecting portion may be provided the computing service by computing node 310, or may be provided the computing service by computing node 320. According to some embodiments of the present disclosure, it is possible to preset which computing node provides the computing service for the user devices in the intersecting portion. According to some other embodiments of the present disclosure, the directions in which the user devices enter the intersecting portion may be used to determine which computing node provides the computing service for the user devices in the intersecting portion. For example, it may be set that when the user devices enter the intersecting portion from the side of computing node 310, the computing service is provided by computing node 320 in the intersecting portion.

According to an embodiment of the present disclosure, when determining that the at least one user device will enter the service range within the threshold time period, computing device 110 may first determine speeds at which user devices including the at least one user device move to the service range and distances from the service range. Then, computing device 110 may determine, based on the speeds and the distances, that the at least one user device will enter the service range within the threshold time period. Preferably, computing device 110 may determine, for each of the at least one user device, a speed of movement to the service range and a distance from the service range, so as to accurately determine that each of the at least one user device will enter the service range within the threshold time period.

According to an embodiment of the present disclosure, when determining that the at least one user device will be switched, within the threshold time period, to being provided the computing service by the computing node, computing device 110 may first determine service boundaries between the computing node to be switched to and computing nodes in at least one computing node that is providing the computing service for the at least one user device. Afterwards, computing device 110 may determine, in response to determining that user devices including the at least one user device will cross one service boundary in the service boundaries within the threshold time period, that the at least one user device will be switched, within the threshold time period, to being provided the computing service by the computing node to be switched to.

As shown in FIG. 3, there is an intersecting portion of the service ranges of computing nodes 310 and 320. According to an embodiment of the present disclosure, in order to accurately determine the timing of adjusting the computing load, a self-developed computing node diagram can be established, for example, by using report information of the user device to determine the boundaries of computing nodes for adjusting the computing load.

The computing node diagram is a logical concept of a remote service area, and theoretically computing nodes can be connected by any authorized user devices, but the user device closest to each wireless access network, that may also be referred to as a remote end, can take advantage of mobile edge computing of 5G networks to the greatest extent, such as ultra-low delay, high scalability, and high throughput. Therefore, this remote service area can be constructed based on the coverage area of the connected wireless access network. For example, if a user device is moving from one wireless access network to another wireless access network with a different remote end, the movement switching point may be regarded as a computing node boundary, because the computing node for the service will change if the user device is still to be connected to the remote end.

Thus, referring to FIG. 3, two conditions can be used to filter user devices in the computing node diagram construction method: (1) the user devices are connected to a wireless access network in which the computing node serves as a remote computing node, and (2) the user devices are running applications/sessions on that computing node. User devices/services that are unable to satisfy the two conditions at the same time will be excluded, and the main area of such user devices constitutes the graphical region of this computing node.

The distance between a user device and the computing node is not a straight line distance, and it is equal to the distance from the user device to the wireless access network plus the distance from the wireless access network to the computing node. Thus, even at the same location, the wireless access network or remote end which provides the service for the user device may vary with external factors, which may affect the shape or boundary of the computing node diagram. Therefore, the distance from the user device to the wireless access network will change and thus the map can be continuously updated. According to an embodiment of the present disclosure, the external factors may include external signal interference, such as weather interference and building interference.

The switching point of the user device may change in some situations. These situations may include, for example: changes in the network topology of computing nodes will affect shapes of the computing nodes; network optimization of the wireless access network, including adding a new wireless access network, removing a wireless access network, adjusting wireless access network signals, or changing switch-related parameters; and environmental changes, which could affect the switch timing and would be a boundary shift reflected in the map.

According to an embodiment of the present disclosure, the application information about operating computing nodes, including the wireless access network ID and radio information of the connected user devices, may be searched, for example, through a radio information application programming interface, and then the user devices may be filtered only when they stay in a wireless access network in which the computing node serves as a remote computing node, and location information of these user devices may be acquired. These accumulated user device locations form a logical computing node diagram for this computing node. In addition, this computing node diagram is provided with a marked radio signal strength, which can be used for advanced functions.

Figure 4:
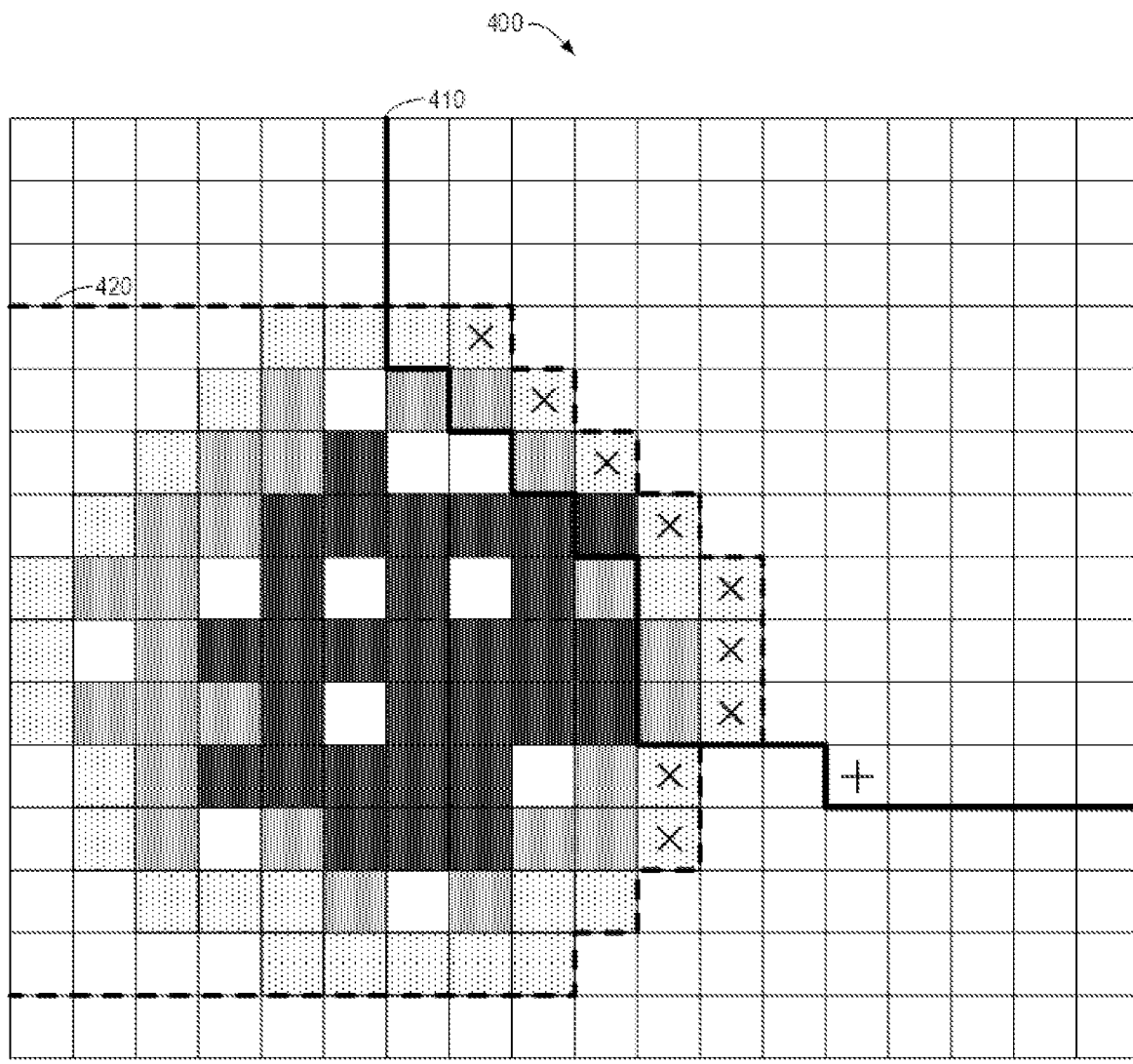
FIG. 4 illustrates a schematic diagram of scenario 400 for determining the boundary of a computing node using a grid diagram according to an embodiment of the present disclosure.

FIG. 4 illustrates a schematic diagram of scenario 400 for determining the boundary of a computing node using a grid diagram according to an embodiment of the present disclosure. Scenario 400 includes service boundary 410 for one computing node and service boundary 420 for another computing node. In this embodiment, a single service boundary for switching computing services with regard to the two service nodes will be further determined. In other words, computing device 110 may determine the service boundary between the computing nodes based on the locations of the at least one computing node that is providing the computing service to the at least one user device and of multiple user devices that are provided the computing service by the computing node to be switched to.

According to an embodiment of the present disclosure, the aggregation of report information may be based, for example, on MEC012, MEC013, and MEC014 in the mobile edge computing application programming interface.

As shown in FIG. 4, there is overlapping between the service ranges of the two computing nodes surrounded by service boundaries 410 and 420. When determining the service boundary between the computing nodes, user devices connected to each computing node can be continuously searched using the criteria defined above. Because the computing node diagram does not change frequently, the searching interval may be long, e.g., 1 day.

For each connected user device, detailed location information can be searched using the mobile edge computing application programming interface MEC013, and the area in which the searched user devices are located will be marked as grids with different density lines in FIG. 4. In addition, radio information of this area can be further acquired via MEC014 in the mobile edge computing application programming interface, so that a very accurate diagram for the computing node can be provided, and the more user devices in a grid, the greater the line density of this grid. The overlapping portion of the two service ranges is marked as the boundary of the two computing node diagrams.

According to an embodiment of the present disclosure, the computing node diagram may be dynamically updated as the service area changes with changes in the above-mentioned situation. In most cases, this should be a minor update and will only affect the margin of the edge. In addition, for each grid, if no user devices are reported from the area to which the grid belongs for multiple consecutive days, e.g., 5 days, this grid shall be deleted from the computing node diagram. For a grid close to the interior of the service area, even if no user device is reported, it is still regarded as the internal range of the computing node, but the radio information it has can be marked as None, NA. The boundary grid is marked with × in FIG. 4. Sporadic grids that are far away from the main computing node diagram, for example, grids marked as +, are not taken into consideration in boundary grid computation, because they will be hidden by the main edge boundary.

According to an embodiment of the present disclosure, since the user devices entering the computing node to be switched to may be provided the computing service by multiple different original computing nodes, a service boundary with the computing node to be switched to may be determined for each original computing node.

According to an embodiment of the present disclosure, when determining that the at least one user device will enter the service range within the threshold time period, computing device 110 may first determine speeds at which user devices including the at least one user device move to one corresponding service boundary and distances from the corresponding service boundary. Then, computing device 110 may determine, based on the speeds and the distances, that the at least one user device will enter the service range within the threshold time period. Preferably, computing device 110 may determine, for each of the at least one user device, a speed of movement to one corresponding service boundary and a distance from the corresponding one service boundary, so as to accurately determine that each of the at least one user device will enter the service range within the threshold time period.

Figure 5:
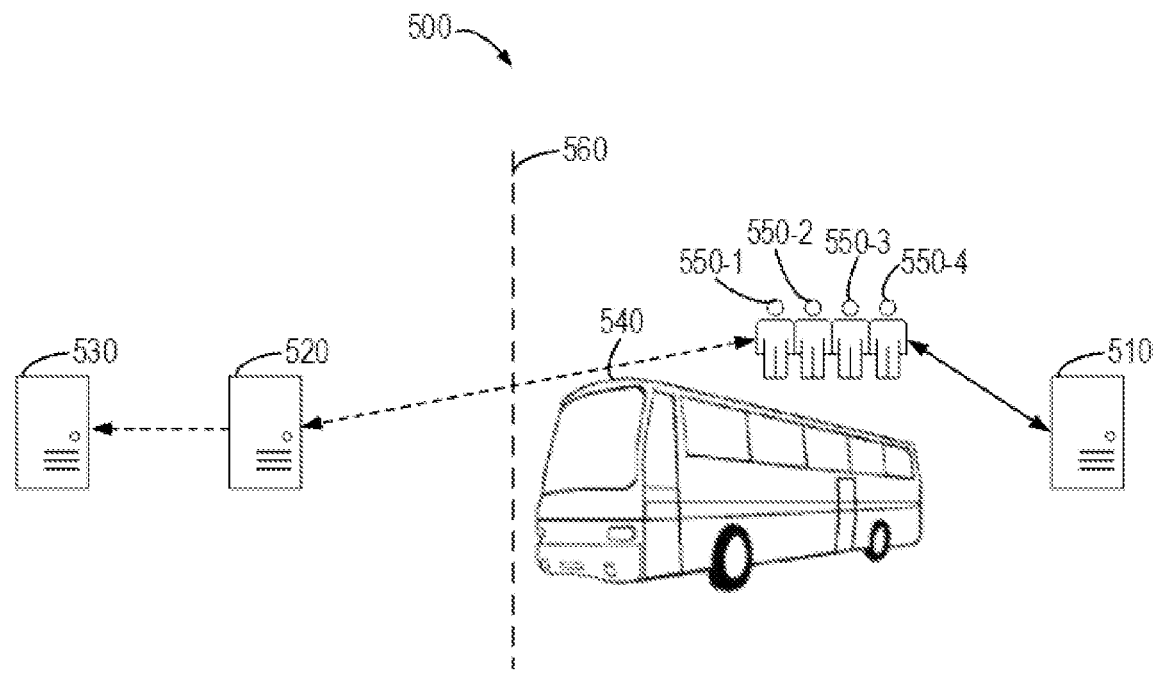
FIG. 5 illustrates a schematic diagram of scenario 500 in which user devices are moving to a service range of another computing node according to an embodiment of the present disclosure.

FIG. 5 illustrates a schematic diagram of scenario 500 in which user devices are moving to the service range of another computing node according to an embodiment of the present disclosure. As shown in FIG. 5, user devices 550-1, 550-2, 550-3, and 550-4 that can be collectively referred to as user devices 550 are riding in a bus 540 and are about to cross service boundary 560 between the service range provided by computing node 510 and the service range provided by computing node 520.

According to an embodiment of the present disclosure, in scenario 500, it can be determined first that user devices 550 are in a common moving state, and then it can be easily determined that user devices 550 will cross service boundary 560 substantially simultaneously and be switched to being provided a computing service by computing node 520. Therefore, in scenario 500, computing device 110 may determine that a speed difference between user devices 550 is less than a threshold speed difference, and determine that a location difference between user devices 550 is less than a threshold location difference, and thus may determine that user devices 550 are in a common moving state. The threshold speed difference and the threshold location difference are set to ensure that user devices 550 are correctly determined to be in a common moving state. According to an embodiment of the present disclosure, the threshold speed difference and the threshold location difference may be set through experience, or may be determined, for example, through machine learning technology. When it is determined that user devices 550 are in a common moving state, the computing device 110 may determine, in response to determining that at least one user device in user devices 550 will enter the service range of computing node 520, that user devices 550 will be switched, within the threshold time period, to being provided a computing service by computing node 520.

According to an embodiment of the present disclosure, it can be determined that user devices 550 are in a common moving state by using the wireless network information application programming interface MEC012, the user identity application programming interface MEC014, and the location application programming interface MEC013 in combination. First, MEC012 and MEC014 may be used to collect all connected user devices for each computing node. For each connected user device, MEC013 may be used to acquire relevant location information, including latitude, longitude, altitude, shape, speed, etc.

According to an embodiment of the present disclosure, in order to avoid excessive data storage, location information may be collected periodically, and the sampling cycle may be set based on the moving speed. For example, for user devices associated with a vehicle, such as a car or bus, sampling is performed once every 1 minute, and for user devices associated with pedestrians, sampling is performed once every 5 minutes.

At the end of each sampling cycle, a user device common moving determination method can be executed to extract common moving user devices from the existing connected user devices.

According to some embodiments of the present disclosure, the user device common moving determination may be performed based on mathematical calculations. At this point, user devices can be classified according to parameters "speed" and "location," and a group of user devices that are moving commonly should have substantially the same moving speed and location. A determination can then be carried out in each class to simplify the calculations. For example, the movement trajectory of each sampled user device can be examined, and the longitude, latitude, and altitude increment values compared with previous moments can be calculated at different moments, and user devices with the same values can be treated as moving commonly. When a user device may possibly stop common moving due to getting off the bus, stopping walking, etc., this user device can be excluded from the multiple user devices that have been determined to be moving commonly, and it can continue to be dynamically determined whether any users are moving commonly.

According to some other embodiments of the present disclosure, the user device common moving determination may be performed based on an artificial intelligence approach. For example, an agglomeration clustering algorithm can be used to perform the user device common moving determination. Since all of the connected user devices may be divided into multiple groups of users that are moving commonly and these groups may change, aggregation clustering algorithms can be used to properly address these challenges. Aggregation clustering algorithms will take a greater amount of calculations than methods based on mathematical calculations, so an appropriate method can be selected based on computing power to perform the user device common moving determination.

Returning to FIG. 2, in block 204, computing device 110 determines the available computing power of the computing node to be switched to. According to an embodiment of the present disclosure, the computing node may directly report its available computing power to computing device 110.

In block 206, computing device 110 determines whether the available computing power of the computing node to be switched to is unable to meet the total computing power demand of the at least one user device determined in block 202. When the available computing power is unable to meet the total computing power demand, method 200 proceeds to block 208.

In block 208, by adjusting the computing load of the computing node to be switched to, computing device 110 adjusts, before the at least one user device is switched to being provided a computing service by the computing node to be switched to, the available computing power of the computing node to be switched to, so as to meet the total computing power demand of the at least one user device. According to an embodiment of the present disclosure, in order to avoid delays in the computing service for the user device, the available computing power of the computing node to be switched to needs to be adjusted before the user device is switched to being provided a computing service by the computing node to be switched to. Therefore, computing device 110 may determine, based on the moving speed of the user device and the distance from the computing boundary of the computing node, when the user device will be switched, determine the length of time required to adjust the computing load of the computing node, and then determine, based on this length of time, the time to start adjusting the computing load, thereby completing the adjustment of the computing load before the user device is switched. Preferably, the adjustment of the computing load can be selected to be completed just as the user device is about to be switched, thus avoiding the waste of computing resources and the increased risk of service interruption caused by premature adjustment.

According to an embodiment of the present disclosure, computing device 110 may use a variety of ways to adjust the computing load of the computing node.

In some embodiments, computing device 110 may migrate to other computing entities a portion of computing load, in the computing node, whose priority is lower than the total computing power demand of the user device to be switched. As shown in FIG. 5, before user devices 550 are switched to being provided a computing service by computing node 520, computing node 520 may migrate to computing node 530 a portion of its computing load whose priority is lower than that of the total computing power demand of user devices 550, so as for computing node 530 to provide the computing service. According to an embodiment of the present disclosure, the computing entity may include entities with computing power, such as a mobile edge computing node, the Internet, a remote server, a data center, etc.

In some other embodiments, computing device 110 may instruct the computing node to suspend a portion of computing load, in the computing node, whose priority is lower than that of the total computing power demand of the user device to be switched, thereby avoiding the potential additional overhead caused by the migration of computing load.

In still some other embodiments, the computing node is instructed to reduce the service quality of a portion of computing load, in the computing node, whose priority is lower than that of the total computing power demand of the user device to be switched, so that this not only can avoid the potential additional overhead caused by the migration of computing load, but also can avoid the adverse effects caused by the complete suspension of these computing loads.

Hereinbefore, example environment 100 in which the device and/or method according to an embodiment of the present disclosure may be implemented, method 200 for adjusting a computing load according to an embodiment of the present disclosure, scenario 300 for determining a service range of a computing node according to an embodiment of the present disclosure, scenario 400 for determining the boundary of a computing node using a grid diagram according to an embodiment of the present disclosure, and scenario 500 in which user devices are moving to the service range of another computing node according to an embodiment of the present disclosure have been described with reference to FIGS. 1 to 5. It should be understood that the above description is to better demonstrate aspects of illustrative embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes can be arbitrarily set as needed without affecting the normal implementation of the embodiments of the present disclosure.

Through the description above with reference to FIGS. 1 to 5, the technical solutions according to the embodiments of the present disclosure have many advantages over conventional solutions.

For example, with the technical solutions of the present disclosure, it is possible to preventively adjust the computing load. Preventive adjustment of the computing load can be used to satisfy a service level agreement of a high-priority service under any extreme conditions, and it can be used to adjust, by transferring, the low-priority computing load on a target computing node, so as to provide preventive unloading, suspending, or downgrading methods for incoming user devices with high-priority service demands on near-overloaded computing nodes, so that it not only can preserve required resources, but also can ensure service quality and smoothness accordingly.

In addition, with the technical solutions of the present disclosure, it is easy to determine user devices that are commonly moving, thereby avoiding functional defects and network congestion caused by a great amount of incoming user devices to the computing nodes to be switched to, and in order to achieve this purpose, in the present disclosure, the user devices that are commonly moving can be determined by analyzing the movement trajectory of each connected user device.

Furthermore, with the technical solutions of the present disclosure, self-evolving computing node diagrams and boundary decisions can be implemented, making it possible to find the optimal timing for adjusting the computing load for the user device with regard to the computing node to be switched to. The computing node service boundary determined through this solution can also be used for any other purpose.

In an example embodiment, an Olympic torch procession is used to illustrate the implementation and effects of the technical solutions of the present disclosure.

At an Olympic torch procession site, torchbearers are typically followed by moving user groups, wherein these users are likely to hold user devices that will have high-priority service demands based on product features or service level agreements purchased from operators. For example, a smooth data service should be ensured when broadcasting the Olympic torch procession to hundreds of millions of viewers through national and other levels of television or network media. For another example, in artificial intelligence and machine learning navigation in automated driving or unmanned aircraft, there are strict requirements for computation and delay. For still another example, some VIP users subscribe to high-quality services from the media in order to have perfect user experience. At the same time, thousands of bystanders are capturing videos and sharing them over the Internet, which will also increase the load on the computing nodes providing the service, and more and more spectators will gather at the next stop of the torch, which will further worsen the network loads on the computing nodes corresponding to the next stop.

At this point, in order to ensure the service level of the VIP users, with the technical solutions of the present disclosure, the low-priority services can be preventively adjusted at the computing nodes corresponding to the next stop in order to reserve sufficient resources for the upcoming high-priority services. At this point, by the time the torchbearers and user groups enter the service range of the computing nodes corresponding to the next stop, there are sufficient resources available for the services.

Figure 6:
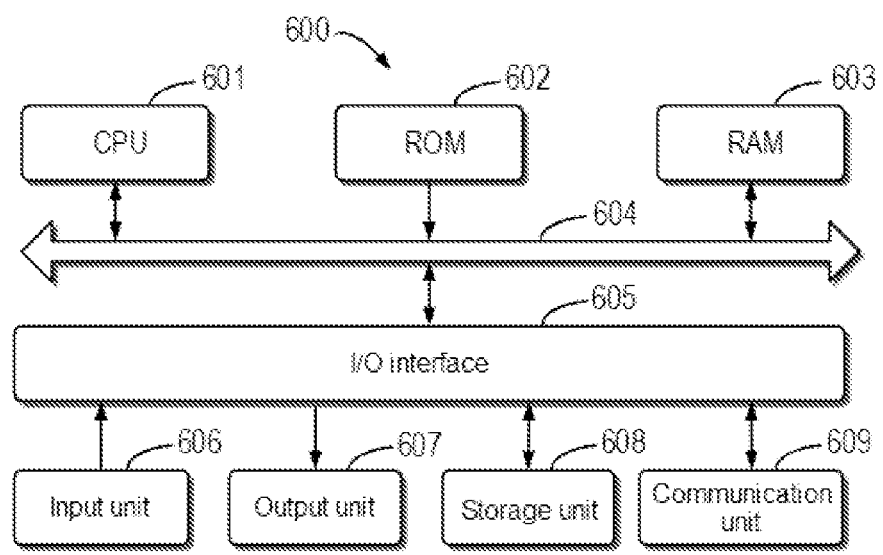
FIG. 6 illustrates a schematic block diagram of example device 600 that can be used to implement an embodiment of the present disclosure.

FIG. 6 illustrates a schematic block diagram of example device 600 that can be used to implement an embodiment of the present disclosure. According to the embodiments of the present disclosure, computing device 110 in FIG. 1 may be implemented by device 600. As shown in the figure, device 600 includes a processing unit, illustratively a central processing unit (CPU) 601, that can execute various appropriate actions and processing according to computer program instructions stored in read-only memory (ROM) 602 or computer program instructions loaded from storage unit 608 into random access memory (RAM) 603. In RAM 603, various programs and data required for the operation of device 600 may also be stored. CPU 601, ROM 602, and RAM 603 are connected to one another through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, for example, method 200, may be performed by CPU 601. For example, in some embodiments, method 200 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200 described above may be executed.

Illustrative embodiments of the present disclosure include a method, a device, a system, and/or a computer program product. The computer program product may include a computer-readable storage medium on which computer-readable program instructions for performing various aspects of the embodiments of the present disclosure are carried.

The computer-readable storage medium may be a tangible device that can hold and store instructions used by an instruction execution device. The computer-readable storage medium may be, for example, but is not limited to, an electric storage device, a magnetic storage device, an optical storage device, an electromagnetic storage device, a semiconductor storage device, or any suitable combination of the foregoing. More specific examples, as a non-exhaustive list, of computer-readable storage media include: a portable computer disk, a hard disk, RAM, ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the embodiments of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or server. In the case involving a remote computer, the remote computer can be connected to a user's computer through any kind of network, including a local area network (LAN) or a wide area network (WAN), or it can be connected to an external computer, for example, connected through an Internet using an Internet service provider. In some embodiments, an electronic circuit, for example, a programmable logic circuit, a field programmable gate array (FPGA), or a programmable logic array (PLA), is personalized by utilizing the state information of the computer-readable program instructions, wherein the electronic circuit may execute computer-readable program instructions so as to implement various aspects of the embodiments of the present disclosure.

Various aspects of the embodiments of the present disclosure are described herein with reference to the flowcharts and/or block diagrams of the methods, the devices/systems, and the computer program products according to the embodiments of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing apparatus, or a further device, so that a series of operating steps can be performed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, the program segment, or the part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, and to otherwise enable persons of ordinary skill in the art to understand the various embodiments disclosed herein.

What is claimed is:

1. A method for adjusting a computing load, including:
determining a total computing power demand of at least one user device that will be switched, due to movement of the at least one user device, to being provided a computing service by a computing node;
determining an available computing power of the computing node;
if the available computing power of the computing node is unable to meet the total computing power demand of the at least one user device, proactively adjusting the available computing power of the computing node before the at least one user device is switched to being provided the computing service by the computing node, so as to ensure that the computing node will be able to meet the total computing power demand of the at least one user device after the at least one user device is switched to being provided the computing service by the computing node; and
switching the at least one user device to being provided the computing service by the computing node based on the movement of the at least one user device;
wherein proactively adjusting the available computing power of the computing node before the at least one user device is switched to being provided the computing service by the computing node comprises adjusting a computing load of the computing node to accommodate the total computing power demand of the at least one user device;
wherein the method further comprises:
determining a service range in which the computing node provides the computing service; and
determining, in response to determining that the at least one user device will enter the service range within a threshold time period, that the at least one user device will be switched, within the threshold time period, to being provided the computing service by the computing node.

2. The method according to claim 1, wherein determining the total computing power demand includes:
determining the total computing power demand in response to determining that the at least one user device will be switched, within the threshold time period, to being provided the computing service by the computing node.

3. The method according to claim 1, wherein determining the service range in which the computing node provides the computing service includes:
determining the service range based on locations of multiple user devices for which a computing service is provided by the computing node.

4. The method according to claim 1, wherein determining that the at least one user device will enter the service range within the threshold time period includes:
determining speeds at which user devices including the at least one user device move to the service range and distances from the service range; and
determining, based on the speeds and the distances, that the at least one user device will enter the service range within the threshold time period.

5. The method according to claim 1, wherein determining that the at least one user device will be switched, within the threshold time period, to being provided the computing service by the computing node includes:
determining service boundaries between the computing node and computing nodes in at least one computing node that is providing a computing service for the at least one user device; and
determining, in response to determining that user devices including the at least one user device will cross one service boundary in the service boundaries within the threshold time period, that the at least one user device will be switched, within the threshold time period, to being provided the computing service by the computing node.

6. The method according to claim 5, wherein determining the service boundaries includes:
determining the service boundaries based on locations of multiple user devices for which a computing service is provided by the computing node.

7. The method according to claim 1, wherein determining that the at least one user device will enter the service range within the threshold time period includes:
determining speeds at which user devices including the at least one user device move to one corresponding service boundary and distances from the corresponding service boundary; and
determining, based on the speeds and the distances, that the at least one user device will enter the service range within the threshold time period.

8. The method according to claim 1, wherein the at least one user device includes multiple user devices, and wherein determining that the at least one user device will be switched, within the threshold time period, to being provided the computing service by the computing node includes:
  determining that a speed difference between the multiple user devices is less than a threshold speed difference;
  determining that a location difference between the multiple user devices is less than a threshold location difference; and
  determining, in response to determining that at least one user device in the multiple user devices will enter the service range, that the at least one user device will be switched, within the threshold time period, to being provided the computing service by the computing node.

9. The method according to claim 1, wherein adjusting the computing load includes:
  determining a length of time required to adjust the computing load; and
  determining, based on the length of time, the time to start adjusting the computing load.

10. The method according to claim 1, wherein adjusting the computing load includes at least one of the following:
  migrating a portion of computing load, in the computing load, whose priority is lower than that of the total computing power demand to other computing entities;
  suspending the provision of services to the portion of low-priority load; and
  reducing a service quality of the portion of computing load, in the computing load, whose priority is lower than that of the total computing power demand.

11. An electronic device, including:
  at least one processing unit; and
  at least one memory which is coupled to the at least one processing unit and stores instructions for execution by the at least one processing unit, wherein the instructions, when executed by the at least one processing unit, cause the electronic device to perform actions including:
  determining a total computing power demand of at least one user device that will be switched, due to movement of the at least one user device, to being provided a computing service by a computing node;
  determining an available computing power of the computing node;
  if the available computing power of the computing node is unable to meet the total computing power demand of the at least one user device, proactively adjusting the available computing power of the computing node before the at least one user device is switched to being provided the computing service by the computing node, so as to ensure that the computing node will be able to meet the total computing power demand of the at least one user device after the at least one user device is switched to being provided the computing service by the computing node; and
  switching the at least one user device to being provided the computing service by the computing node based on the movement of the at least one user device;
  wherein proactively adjusting the available computing power of the computing node before the at least one user device is switched to being provided the computing service by the computing node comprises adjusting a computing load of the computing node to accommodate the total computing power demand of the at least one user device;

wherein the actions further comprise:
  determining a service range in which the computing node provides the computing service; and
  determining, in response to determining that the at least one user device will enter the service range within a threshold time period, that the at least one user device will be switched, within the threshold time period, to being provided the computing service by the computing node.

12. The electronic device according to claim 11, wherein determining the total computing power demand includes:
  determining the total computing power demand in response to determining that the at least one user device will be switched, within the threshold time period, to being provided the computing service by the computing node.

13. The electronic device according to claim 11, wherein determining the service range in which the computing node provides the computing service includes:
  determining the service range based on locations of multiple user devices for which a computing service is provided by the computing node.

14. The electronic device according to claim 11, wherein determining that the at least one user device will enter the service range within the threshold time period includes:
  determining speeds at which user devices including the at least one user device move to the service range and distances from the service range; and
  determining, based on the speeds and the distances, that the at least one user device will enter the service range within the threshold time period.

15. The electronic device according to claim 11, wherein determining that the at least one user device will be switched, within the threshold time period, to being provided the computing service by the computing node includes:
  determining service boundaries between the computing node and computing nodes in at least one computing node that is providing a computing service for the at least one user device; and
  determining, in response to determining that user devices including the at least one user device will cross one service boundary in the service boundaries within the threshold time period, that the at least one user device will be switched, within the threshold time period, to being provided the computing service by the computing node.

16. The electronic device according to claim 15, wherein determining the service boundaries includes:
  determining the service boundaries based on locations of multiple user devices for which a computing service is provided by the computing node.

17. The electronic device according to claim 11, wherein determining that the at least one user device will enter the service range within the threshold time period includes:
  determining speeds at which user devices including the at least one user device move to one corresponding service boundary and distances from the corresponding service boundary; and
  determining, based on the speeds and the distances, that the at least one user device will enter the service range within the threshold time period.

18. A computer program product tangibly stored in a non-transitory computer-readable medium and including machine-executable instructions, wherein the machine-executable instructions, when executed, cause a machine to perform steps of a method for adjusting a computing load, the method including:

determining a total computing power demand of at least one user device that will be switched, due to movement of the at least one user device, to being provided a computing service by a computing node;

determining an available computing power of the computing node;

if the available computing power of the computing node is unable to meet the total computing power demand of the at least one user device, proactively adjusting the available computing power of the computing node before the at least one user device is switched to being provided the computing service by the computing node, so as to ensure that the computing node will be able to meet the total computing power demand of the at least one user device after the at least one user device is switched to being provided the computing service by the computing node; and switching the at least one user device to being provided the computing service by the computing node based on the movement of the at least one user device;

wherein proactively adjusting the available computing power of the computing node before the at least one user device is switched to being provided the computing service by the computing node comprises adjusting a computing load of the computing node to accommodate the total computing power demand of the at least one user device;

wherein the method further comprises:

determining a service range in which the computing node provides the computing service; and determining, in response to determining that the at least one user device will enter the service range within a threshold time period, that the at least one user device will be switched, within the threshold time period, to being provided the computing service by the computing node.

19. The computer program product according to claim 18, wherein determining the total computing power demand includes:

determining the total computing power demand in response to determining that the at least one user device will be switched, within the threshold time period, to being provided the computing service by the computing node.

20. The computer program product according to claim 18, wherein determining the service range in which the computing node provides the computing service includes:

determining the service range based on locations of multiple user devices for which a computing service is provided by the computing node.

* * * * *

UNITED STATES PATENT AND TRADEMARK OFFICE
CERTIFICATE OF CORRECTION

PATENT NO. : 11,681,560 B2  
APPLICATION NO. : 17/101052  
DATED : June 20, 2023  
INVENTOR(S) : Bin He et al.

Page 1 of 1

It is certified that error appears in the above-identified patent and that said Letters Patent is hereby corrected as shown below:

On the Title Page

In (73) Assignee:
Please delete "EMC IP Holdinq Company LLC" and insert therefor --EMC IP Holding Company LLC--

Signed and Sealed this
Twenty-fifth Day of July, 2023

Katherine Kelly Vidal
*Director of the United States Patent and Trademark Office*